United States Patent
Lohtia et al.

(10) Patent No.: US 7,085,249 B2
(45) Date of Patent: Aug. 1, 2006

(54) DYNAMIC QOS FOR INTEGRATED VOICE AND DATA CDMA/1XRTT NETWORKS

(75) Inventors: Anit Lohtia, Plano, TX (US); Miroslav Budic, Murphy, TX (US); Yuqiang Tang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 977 days.

(21) Appl. No.: 10/020,672

(22) Filed: Dec. 14, 2001

(65) Prior Publication Data

US 2003/0112784 A1    Jun. 19, 2003

(51) Int. Cl.
*H04B 7/216* (2006.01)
*H04J 3/16* (2006.01)

(52) U.S. Cl. .................. 370/329; 370/335; 370/465

(58) Field of Classification Search ........ 370/328–329, 370/335, 342, 468, 431, 441
See application file for complete search history.

(56) References Cited

U.S. PATENT DOCUMENTS 6,567,428 B1 * 5/2003 Rubin et al. ............ 370/538
6,775,233 B1 * 8/2004 Kumaran et al. ........ 370/230.1

* cited by examiner

Primary Examiner—Andrew C. Lee
(74) Attorney, Agent, or Firm—Trop, Pruner & Hu, P.C.

(57) ABSTRACT

A method, system and program product which improves the QoS and GoS of voice and data traffic on an integrated communications network. An RF spectrum allocation application/algorithm provides initial allocation of a percentage of available spectral resources to current voice and data traffic. Each allocated percentage is bounded by a sliding window, which adjusts its location based on the changing need for the resources. Thus, a voice sliding window dynamically adjusts its location to provide additional spectral resources to voice traffic when the voice traffic increases and provides less spectral resources when the voice traffic decreases. Likewise, a data sliding window dynamically adjusts its location to provide additional spectral resources to data traffic when the data traffic increases and provides less spectral resources when the data traffic decreases. The size of each window is determined by input parameters. When heavy voice and/or data traffic is present, the maximum available spectral resources are utilized and shared between both traffic types based on the RF spectrum allocation algorithm. Whenever an overlap in the windows occurs, the algorithm dynamically determines which of the traffic types to allocate the remaining spectral resources based on a number of factors, including the cost/financial factors and QoS and GoS calculations.

27 Claims, 9 Drawing Sheets

DYNAMIC QOS FOR INTEGRATED VOICE AND DATA CDMA/1XRTT NETWORKS

BACKGROUND OF THE INVENTION

1. Technical Field

The present invention relates in general to a communications network, and in particular to voice and data transmission on an integrated communications network. Still more particularly, the present invention relates to a method and system for providing dynamic quality of service for voice and data transmission on an integrated CDMA/1XRTT communications network.

2. Description of the Related Art

Spectral resources (i.e., radio frequency) in telecommunications networks, particularly in wireless networks, are becoming more and more scarce as the volume of traffic increases. The traditional communication systems provided separate networks (or channels) for voice traffic and data traffic because of the various differences between voice and data transmission systems. Thus, most spectral resources were allocated solely to voice traffic and the remaining (smaller percentage of) resources were allocated for data traffic.

Spectral resources are scarce in a wireless network and have to be shared between voice and data services. With the high increase of both voice and data traffic and improvements in technology, the use of separate networks for voice and data transmission has given way to utilization of a single telecommunication network to transmit large amounts of data in addition to the voice transmission. Current implementation of code-division multiple access (CDMA) cellular communications network, for example, provide wireless communication service over a defined service area and allows numerous signals to occupy a single transmission channel in an attempt to optimize the utilization of available bandwidth.

These available transmission resources are represented by a set amount of radio frequency (RF) resources/channels assigned to the particular network and capable of transmitting both data and voice traffic simultaneously. The quality of transmission for both voice and data and the grade of service for data transmission is a growing concern in the industry as both transmission types battle for increase allocation of available bandwidth.

Network operators have started to rollout 1XRTT data service over their existing CDMA networks. This rollout requires the allocation of resources between voice and data services. There are limitations on the forward link power transmitted due to power amplifier limitation and number of Walsh codes available. Therefore, compromise has to be made between allocation of resources for voice and data.

Thus, in many of today's integrated communication systems, both voice and data traffic are carried over shared access networks, i.e., voice and data traffic share the same spectral resources on the air interface. In current RF planning of the resources in a wireless communication system, resources for both services (i.e., voice and data) have to be allocated. However, the service requirements for voice and data networks are different. For example, a voice network requires dedicated channels for the entire duration of a voice call because voice traffic cannot be delayed. On the other hand, data traffic for non-real time applications can be delayed based on established Quality of Service (QoS) requirement. With current designs, the spectral resources are hard divided in two sets (i.e., fixed partitions), one portion (or percentage) dedicated solely to voice traffic and the other remaining portion dedicated solely to data traffic. This hard-division of spectral resources results in below optimal use of scarce spectral resources, drastic decreases in overall capacity of the network due to non-linear decrease in capacity, and degradation of Grade of Service (GoS) and/or Quality of Service (QoS) of the shared voice and data networks.

Figure 1A:
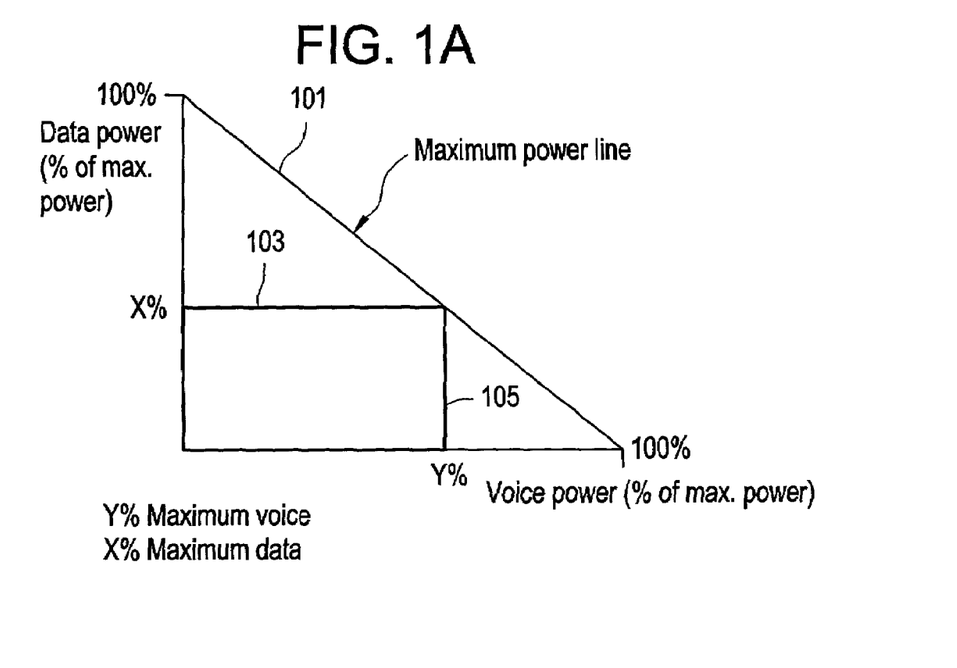
FIGS. 1A and 1B are graphical illustrations of current fixed percentage RF channel allocations between voice and data in accordance with the prior art.
Figure 1B:
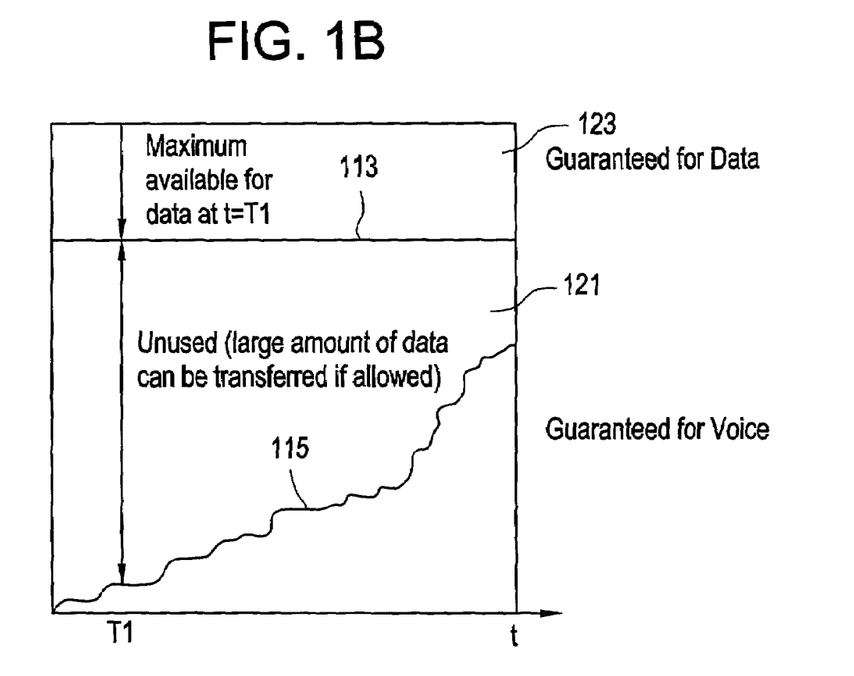

FIGS. 1A and 1B illustrates fixed-partition implementations of shared RF resources. The entire grid represents 100 percent of the available spectral resources that may be allocated. The fixed amount of power (i.e., spectral resources) allocated to data is plotted on the Y axis as a horizontal maximum data percentage allocation (X %) line 103, which is a percentage of full maximum (i.e. 100%) power line 101. Conversely, the fixed amount of power allocated to voice is plotted on X axis as a vertical maximum voice percentage allocation (Y %) line 105, which is also a percentage of the maximum available power. Notably, voice power allocation (i.e., Y %) is illustrated as a much larger percentage of the maximum available power. Ideally the total allocated power (i.e. X %+Y %) sums to 100% of available power although this is not necessarily the case.

FIG. 1B graphs the actual voice power usage 115 plotted within the power sector allocated to voice transmission from time T1. Voice-Data power separation line 113 clearly indicate the non-changing percentage of power guaranteed for data 123 and that guaranteed for voice 121. As can be seen by actual voice power usage 115, not all of the power allocated to voice is utilized. However, the unutilized power is available only for additional voice transmission.

With the fixed division of the spectral resources, the spectral resources are separately allocated for voice and data transmission. Voice and data traffic cannot overflow into (or utilize) each other's allocated resources even if, for example, data transmission requires more spectral resources at time T1 than X % allocation. This results in inefficient use (or non-use) of the scarce resources. Since there are nonlinear increases in GoS with additional resources (or nonlinear decreases in GoS with decreased resources), the GoS of voice networks is adversely affected by these fixed divisions. Similarly, for the data networks, QoS is adversely affected.

One current approach that addresses the fixed division of the spectral resources allows the Y % allocation for the voice transmission to be expandable into the "fixed" percent (X %) allocated to data traffic. Typically, this permits the voice traffic to encroach into the data RF resources in a somewhat dynamic manner, while still restricting the RF resource allocation for data traffic to X %. With this approach, although the QoS of voice traffic may be maintained, the QoS of data traffic is adversely affected. Also, the spectral resources are used at sub-optimum levels. Additionally, there is no consideration given to cost factors when allocating additional voice bandwidth. Dynamically allocating the data resources to voice without consideration of these cost factors could result in severe financial loss to the provider of these transmission services to paying customers.

Figure 2A:
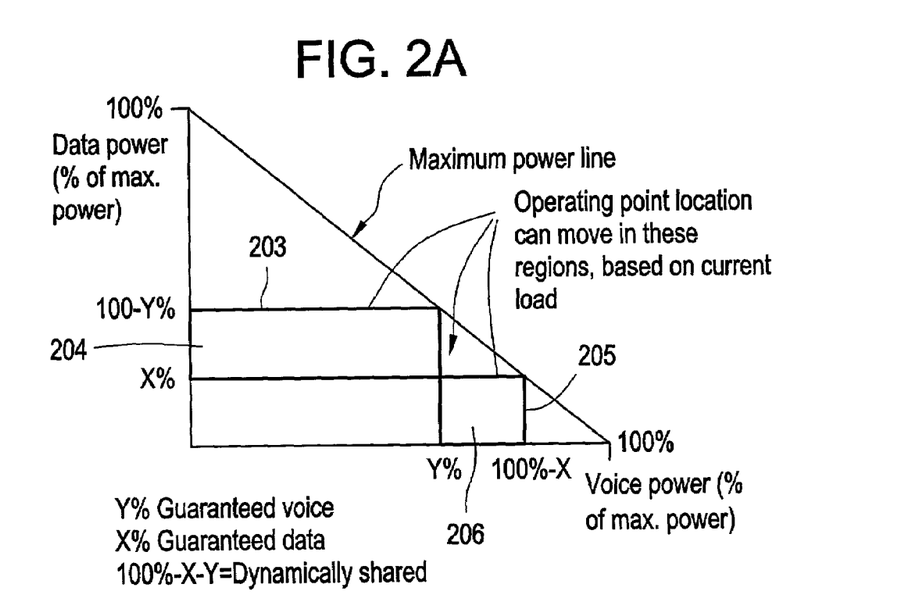
FIGS. 2A and 2B are graphical illustrations of current pseudo-dynamic percentage RF channel allocation of voice traffic in accordance with the prior art.
Figure 2B:
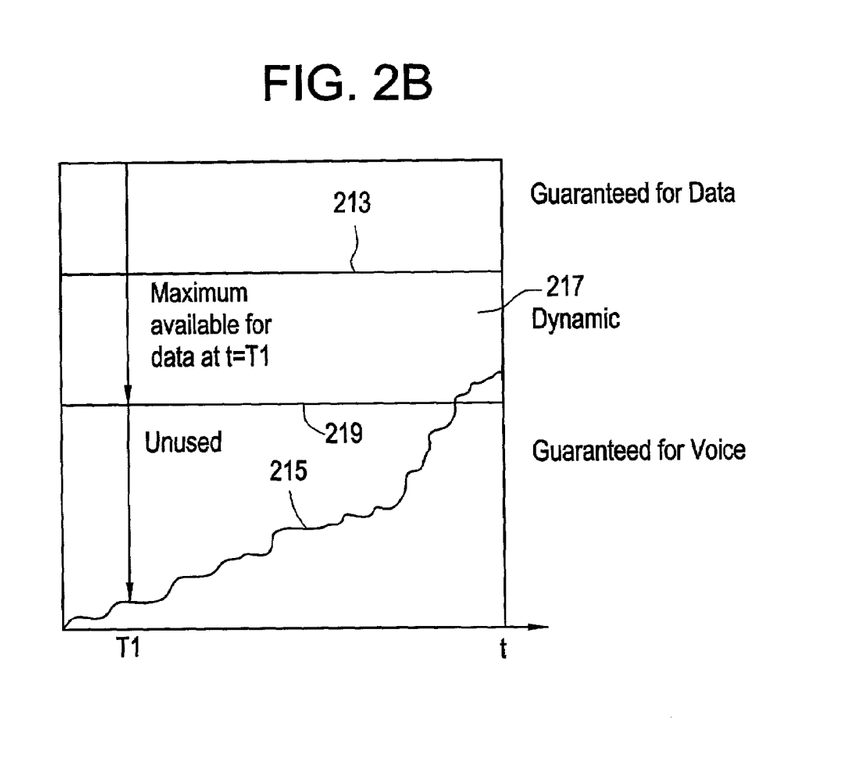

FIGS. 2A and 2B illustrate pseudo-dynamic allocation of data power and voice power as a percentage of total spectral power. Vertical window area 204 includes area X % to (100-Y) % of additional spectral power in which additional data traffic may be allocated up to a fixed maximum percentage 203. Likewise, horizontal window area 206 includes area Y % to (100-X) % of additional spectral power in which additional voice traffic may be allocated up to another fixed maximum percentage 205.

With this flexible allocation process, as shown in FIG. 2B, a hard line maximum 219 still exists for data power allocation although the utilized percentage for data may be increased from initial soft line 213 guaranteed for data up to hard line maximum 219. Notably, although data allocation may be extended through dynamic sector 217 of available power, there still exists a significant amount of unused voice spectral resources compare to actual voice power usage 215. This additional unused resource exists regardless of whether or not data transmission is in need of additional resources. With current data transmission of large files, such as image files, requiring significant amounts of available resources, this flexible/pseudo-dynamic allocation still leads to inefficiency and waste of available resources when the actual voice power usage 215 is substantially below the hard line maximum 219. Again, no cost factors are considered during this pseudo dynamic allocation, which could result in significant negative financial implications for the provider of the services. Thus, these current implementations make resource deployment optimization difficult to achieve.

In light of the foregoing, the present invention recognizes that it would be desirable to provide a method and system for improving QoS and GoS for data and voice traffic in a communications network. A method and system, which implement dynamically adjustable spectral resource allocation between voice and data depending on actual need would be a welcomed improvement. It would be further desirable if the dynamically adjustable spectral resource allocations took into consideration cost factors during the determinations of how to allocate the available resources. These and other benefits are provided in the present invention.

SUMMARY OF THE INVENTION

Disclosed is a method, system and program product which improves the QoS and GoS of voice and data traffic on an integrated communications network. An RF spectrum allocation application/algorithm provides initial allocation of a percentage of available spectral resources to current voice and data traffic. Each allocated percentage is bounded by a sliding window, which adjusts its location based on the changing need for the resources. Thus, a voice sliding window dynamically adjusts its location to provide additional spectral resources to voice traffic when the voice traffic increases and provides less spectral resources when the voice traffic decreases. Likewise, a data sliding window dynamically adjusts its location to provide additional spectral resources to data traffic when the data traffic increases and provides less spectral resources when the data traffic decreases. The size of each window is determined by input parameters. When heavy voice and/or data traffic is present, the maximum available spectral resources are utilized and shared between both traffic types based on the RF spectrum allocation algorithm. Whenever an overlap in the windows occurs, the algorithm dynamically determines which of the traffic types to allocate the remaining spectral resources based on a number of factors, including cost/financial factors and QoS and GoS calculations. In this manner, the QoS and GoS of voice and data traffic are maximized and a most economical and efficient utilization of the RF resources is provided.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

Figure 3A:
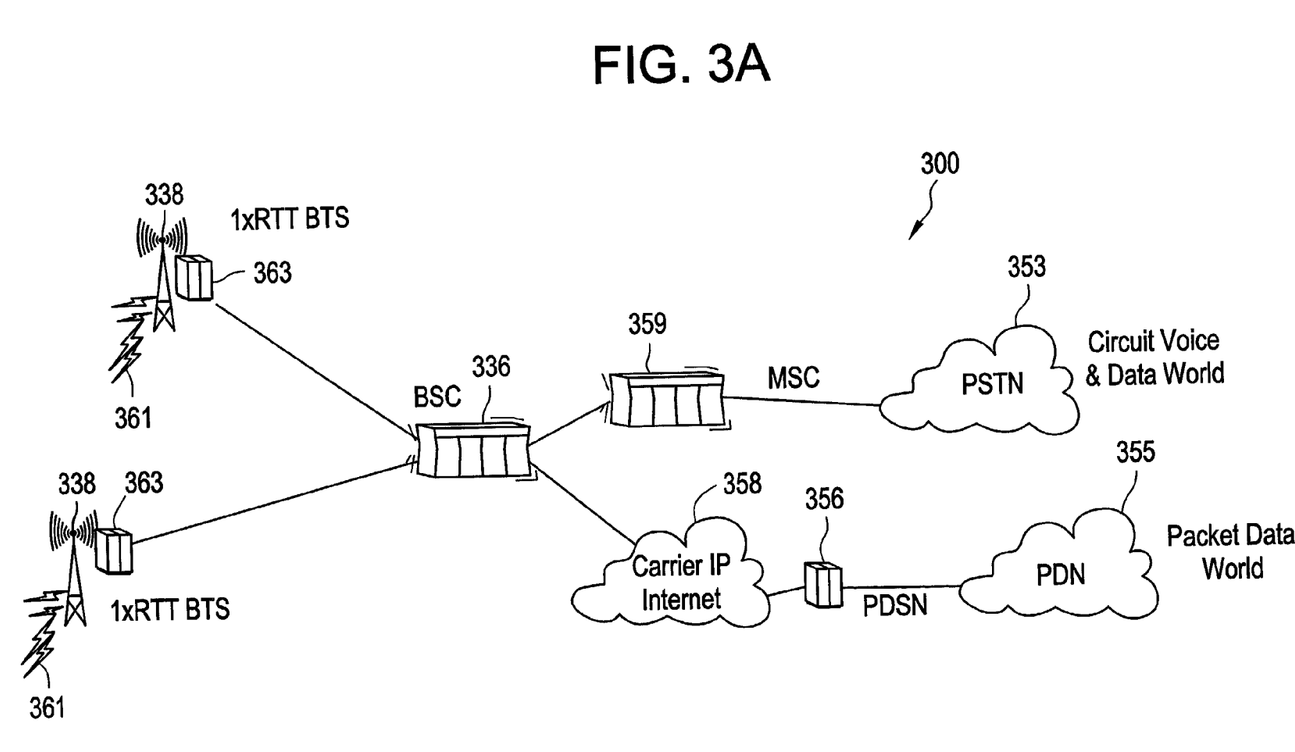
FIG. 3A illustrates a basic communications network in which the invention may be implemented with originating traffic transmitted to a destination via an RF channel.

With reference now to the figures and in particular with reference to FIG. 3A, there is illustrated a sample communications network, which may preferably be a CDMA network operating with RF allocation of data and voice traffic. Network 300 comprises a number of transmission antennas 338, which transmit and receive RF signals 361 to and from each other. RF signals are generated by base station transceivers 363, each affiliated with one of the transmission antennas 338. Base station transceivers 363 are in turn coupled to and controlled by base station controller 336. Coupled to base station controller 336 are network/communication terminals which originate and receive the communications transmitted as RF signals.

According to FIG. 3A, network terminals from which communications originate (i.e., producers) include circuit voice and data network (typically a public switched telephone network (PSTN)) 353 and packet data network (PDN) 355. PSTN 353 is illustrated as connected to BSC 336 via a direct land line which includes a mobile switching center (MSC) 359. PDN connects to BSC 336 via a PDSN 356 and the Internet 358. It is understood that both voice and data network 353 and PDN 355 may comprise wireless devices (e.g., cellular phones).

A single network terminal may operate as the source or recipient of both data and voice communications. Additionally, similar network terminals may be utilized as receivers (consumers) of the network communications as those utilized as producers of the communication. The processes of the invention are primarily implemented within base station controllers associated with the producers of the network communications. Although, in one embodiment, the transmission device is itself provided with the logic components necessary to complete the processes of the invention. It is understood that some or all of the base station controllers and/or transmission devices within the network may utilize the features of the invention for voice and data transmission within an integrated network.

Figure 3B:
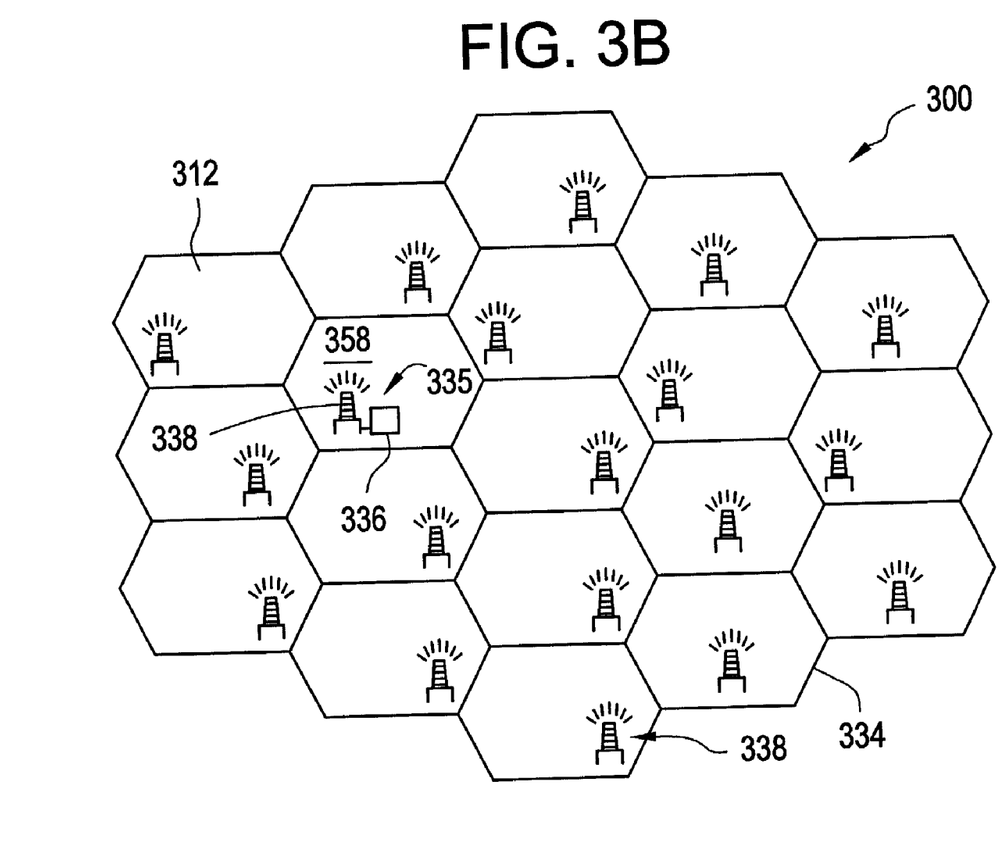
FIG. 3B illustrates a CDMA network in which one embodiment of the present invention may be implemented.

The invention may be implemented in various network types which support RF transmission. However, the illustrated embodiment of the invention is described with reference to a CDMA network. FIG. 3B illustrates CDMA network 300, which includes a plurality of cells 312 and corresponding base stations 335. A representative cell 358 of CDMA network represents a fan-out area for propagation of signals from base station antenna 338 affiliated with base station 335. Thus, CDMA network 300 comprises a plurality of base stations 335 and affiliated base station antenna 338. Base station 335 in representative cell 358 also has an affiliated base station controller (BSC) 336, which manages the communication processes of base station 335. CDMA network 300 provides communication between one mobile unit (not shown) and another mobile unit or other communication device/terminal.

Figure 3C:
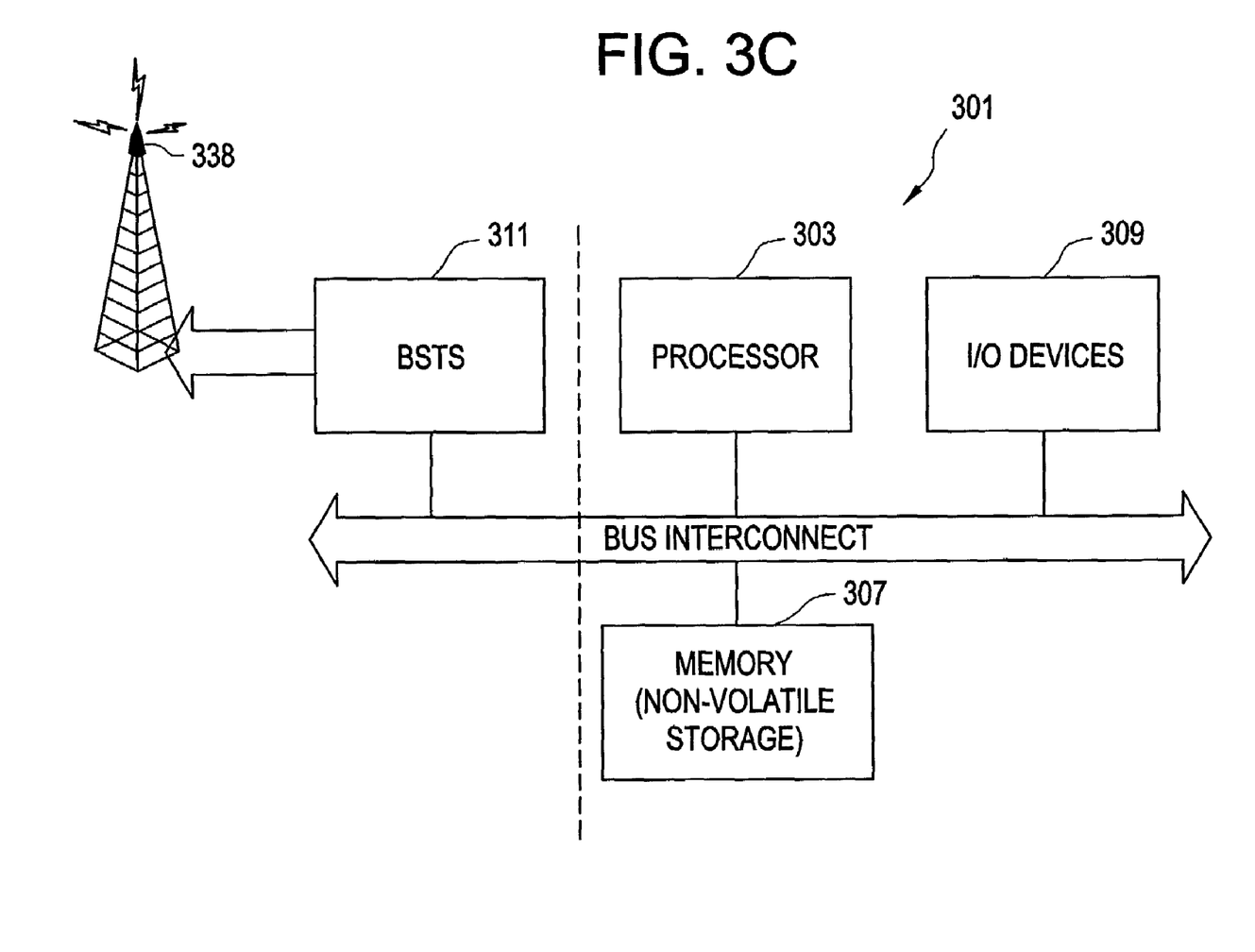
FIG. 3C is a block diagram of the basic component parts of a processing system which may be utilized to implement the various processing steps of the present invention.

Base station 335 (or typically base station controller 336) includes a data processing system or processor (e.g., router, switch and/or switching center) by which frequency allocation and other communication features (such as billing) of CDMA network 300 are controlled/managed. An exemplary configuration of a data processing system of base station controller 336, which may be advantageously utilized to complete the processes of the invention is illustrated in FIG. 3C. Data processing system 301 comprises a processor 303 that controls (i.e., executes) the operations provided in the present invention. Coupled to processor are 303 memory 307, which may comprise non-volatile storage, and Input/Output (I/O) devices 309.

During traffic routing, access to a carrier frequency for completing a communication is controlled by a base station transceiver subsystem (BSTS) 311 connected to data processing system 301 of base station controller 336. BSTS 311 operates as the carrier frequency controller. In one embodiment, software coded features of the present invention are stored in non-volatile storage 307 and executed on processor 303. In another embodiment, these features are encoded on a input medium that is readable by data processing system 301. Results generated from processor 303 during execution of the software code/algorithm of the invention are then provided to BSTS 311, which operates to allocate frequency among voice and data traffic based on the algorithm provided. Routing of traffic is completed via antenna 338 that is coupled to BSTS 311.

The present invention is implemented as a software-based control algorithm to provide improved spectral efficiency and utilization of scarce radio frequency (RF) spectral resources. According to the illustrative embodiment, the invention proposes an algorithm of dynamic allocation of resources for the voice and data network. The invention provides real time radio resource management for integrated voice and data carriers and improved spectral efficiency for the network. The key implementation feature of the invention comprises a dynamic partition with sliding protection windows within the available spectral resources. Also, in the illustrative embodiment, there are no fixed limits on the resource allocation of any of the two networks.

At a given instant in time overflow from voice to data or data to voice is permitted. Since traffic is statistically distributed, this results in the most optimum utilization of radio resources. The illustrative embodiment of the invention provides for prioritization of one service over the other service using the reservation window. The reservation window is a sliding window, and moves continuously with the radio resource allocation in the network.

In the preferred embodiment, the resource allocation preference is determined as a cost function. The operators, based on their revenue systems and business models are able to determine the cost of resource allocation for two networks. This information is programmed into the algorithm and during implementation, spectral resource usage is optimized based on a cost function and network conditions dynamically (i.e., in real time).

Figure 4A:
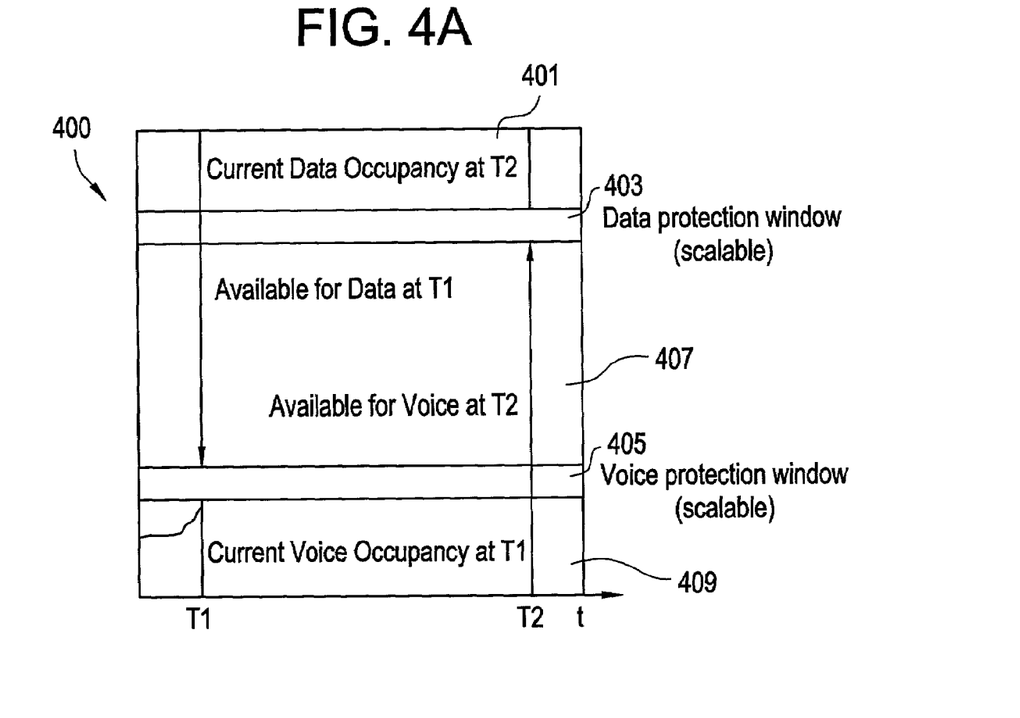
FIGS. 4A–4C are graphical illustrations of full dynamic-percentage RF channel spectrum allocations for both voice and data traffic via sliding windows in accordance with one embodiment of the present invention.
Figure 4B:
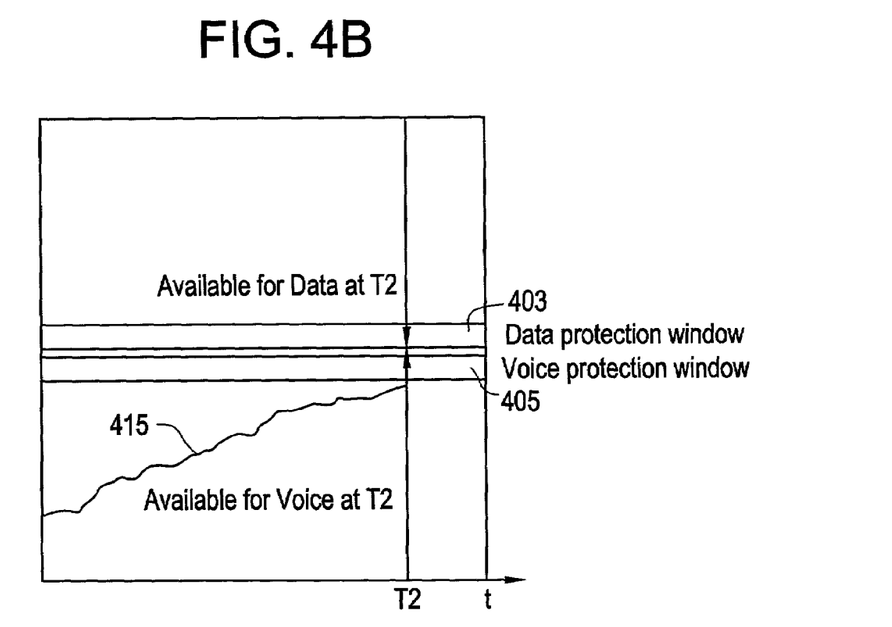
Figure 4C:
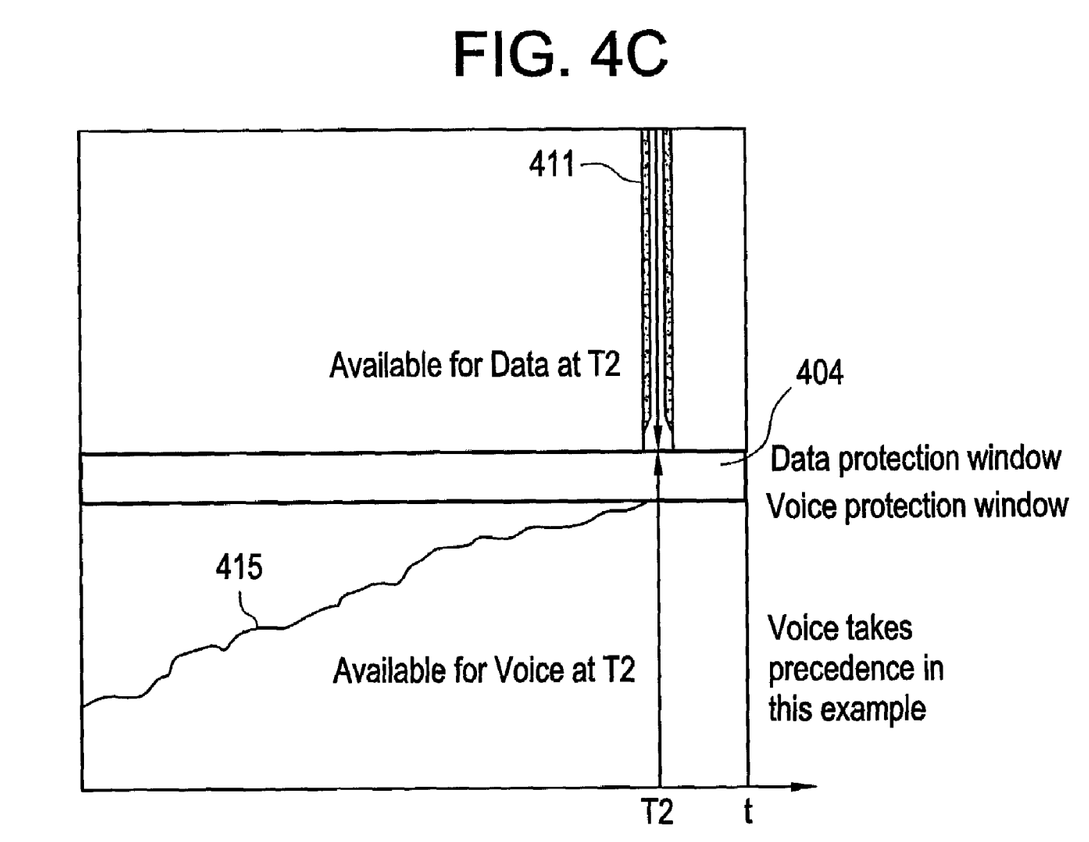

FIGS. 4A–4C illustrate the dynamic percentage allocation for data and voice allocation according to the invention. Current data allocation 401 and current voice allocation 409 are soft-bounded by data protection window 403 and voice protection window 405, respectively. The sizes of both data protection window 403 and voice protection window 405 are scalable and/or adjustable. The sizes are selected by the operator of the base station during initialization of the algorithm on the base station's processor or later updates to the algorithms parameters.

The protection windows are utilized to (1) secure spectral resources for new call/session originations beyond the current resource allocation, (2) enable efficient management of allocation of additional spectral resources between competing traffic types (i.e., voice and data). The size of the protection windows may be set for each BTS sector to allow flexibility.

Returning to FIGS. 4A–4C, the unallocated spectral resources 407 between the outer boundaries/edges of both data and voice windows are available for allocation to either data or voice depending on present need and other preprogrammed factors. The directional arrows indicate the slide direction of each protection window as more data or voice traffic is detected, which require more spectral resources. As shown in FIG. 4B, the protection windows shift into unallocated resource areas as the amount of data and voice traffic increases. Actual voice traffic usage 415 is illustrated increasing from time $T_1$ to $T_2$ in FIG. 4B.

Notably, according to the illustrative embodiment, there is no pre-determined fixed limit for resource sharing. As the windows slide to incorporate more resources to their respective traffic types, they eventually meet and then, as additional resources are allocated to one of these windows, the window areas begin to overlap forming an overlapped window region 404. The control parameters of the RF algorithm are pre-programmed to allow either the voice or data window to take preference whenever window overlapping occurs. This feature is also user-settable to allow flexibility, particularly when a different busy hour is being utilized for voice and data. The traffic type that is provided preference during overlap can be dynamically changed either on a timer basis or by user action.

According to the illustrated embodiment, voice transmission takes preference in the determination of which traffic type to allocate spectral resources as the windows overlap. Thus, FIG. 4C illustrates the situation in which the protection windows overlap. As shown by the directional arrows, the overlapped area is allocated to voice traffic transmission. With a change in the allocation parameters, however, the overlap areas may be allocated to data traffic.

Figure 5A:
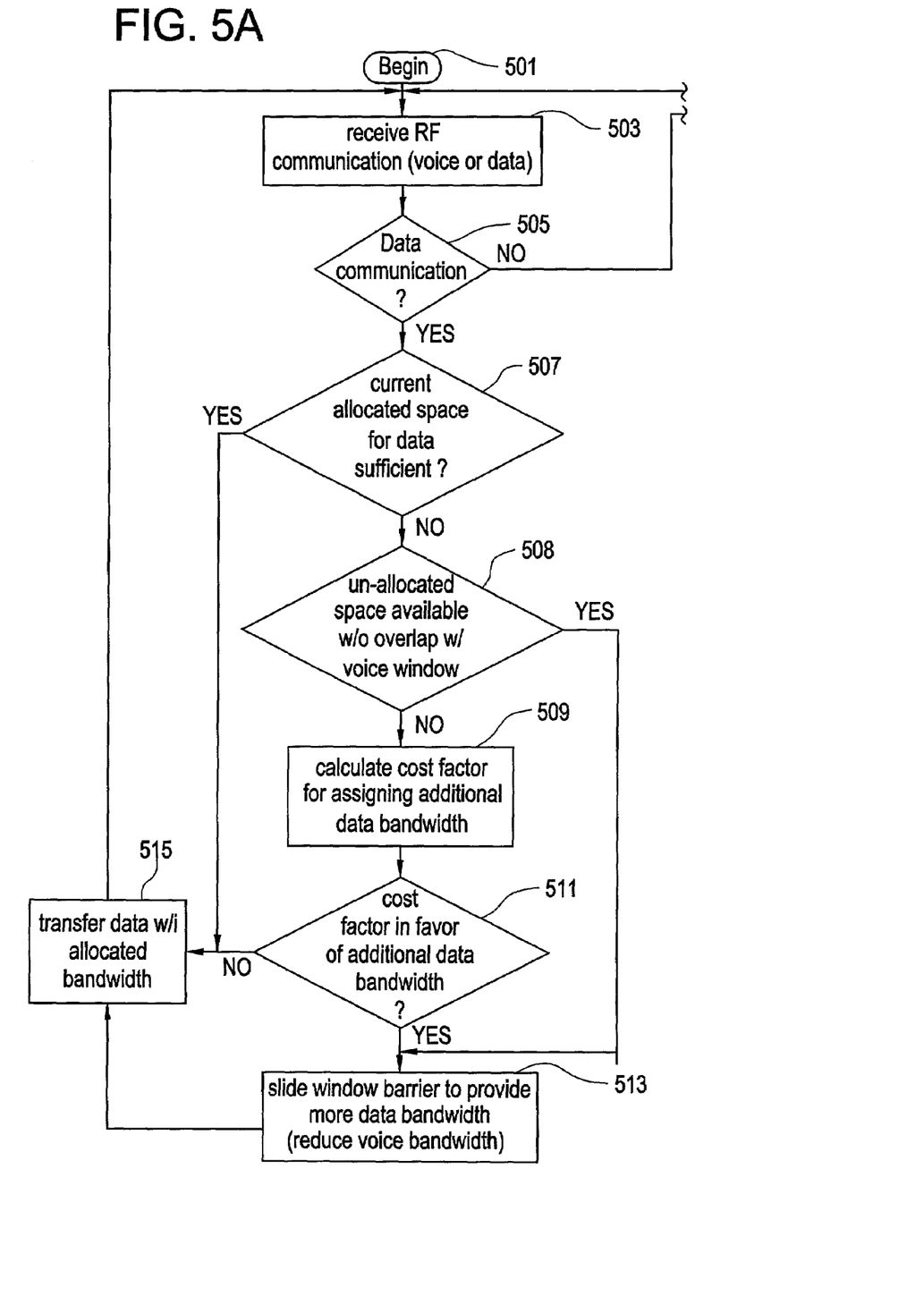
FIG. 5A continued on FIG. 5B is a flow chart illustrating the major processes involved in determining when to slide the sliding window of FIGS. 4A–4C to accommodate the changing needs for voice or data bandwidth in an RF channel in accordance with one embodiment of the present invention.
Figure 5B:
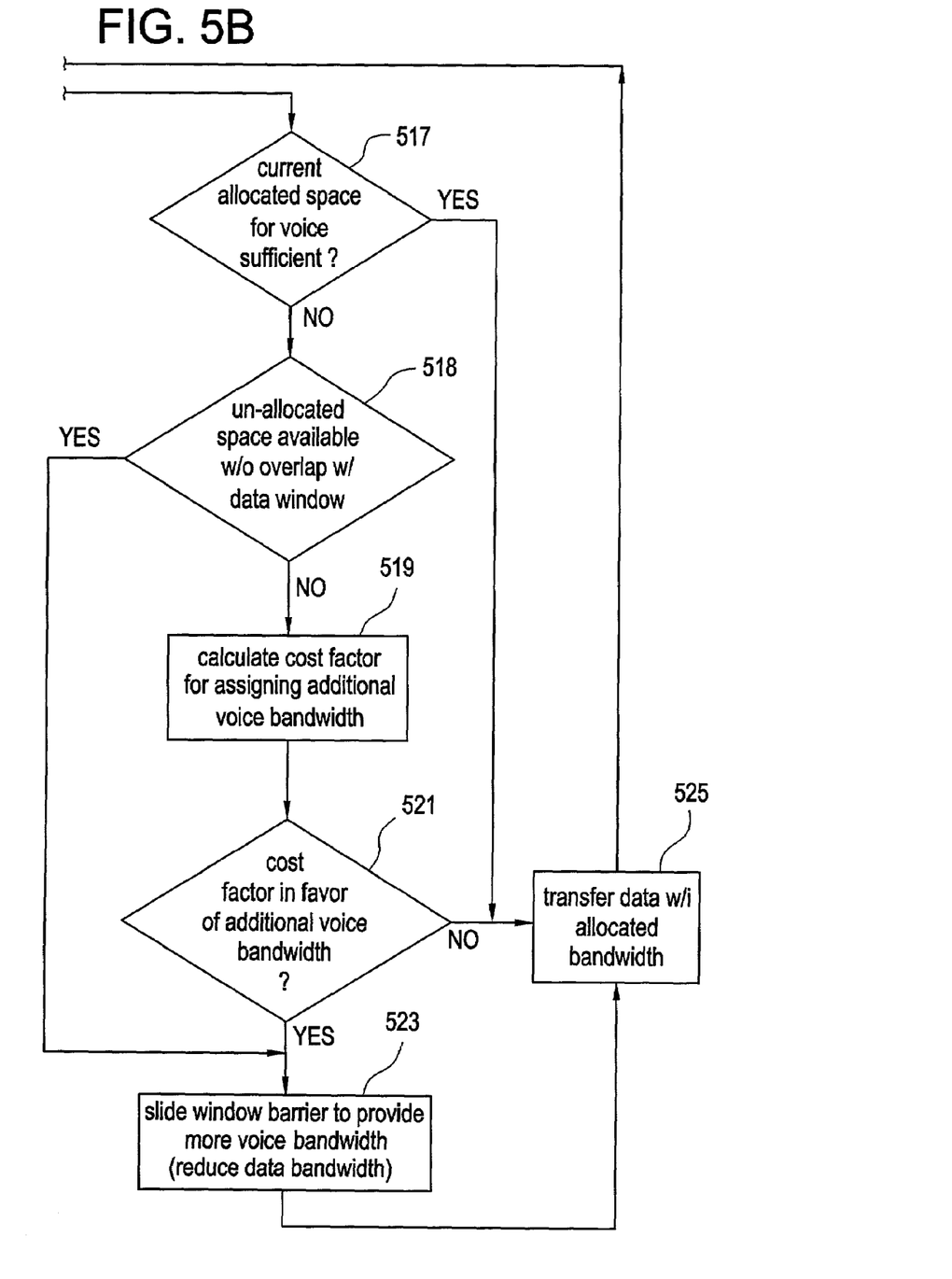

Referring now to FIG. 5A, the process by which dynamic spectral resource allocation for data and voice traffic is provided via sliding windows is described. The process begins at block 501 and thereafter proceeds to block 503, which indicates receipt of a RF communication. A determination is made at block 505 whether the communication is data or voice traffic. If the communication is voice traffic, a determination is made at block 517, whether the current spectral resources allocated for voice traffic is sufficient. When the allocated space is sufficient, the voice is transferred within the current allocated resources as shown at block 525. If, however, the space is not sufficient, then as illustrated on FIG. 5B, a next determination is made at block 518 whether there are unallocated resources available without causing an overlap with the data protection window. If there are not sufficient unallocated spectral resources available, a cost factor is automatically calculated for assigning additional bandwidth/resources to voice as shown at block 519. Then, a next determination is made at block 521 whether the cost factor is in favor of additional data bandwidth being allocated. When the cost factor is in favor of the additional bandwidth or there were sufficient unallocated resources available, the voice protection window is adjusted (i.e., slided up) to provide more voice bandwidth as shown at block 523. Voice traffic is then transferred within the allocated bandwidth as indicated at block 525.

Returning to block 505 of FIG. 5A, when the communication is data communication, a determination is made at block 507, whether the current spectral resources allocated for data traffic is sufficient. When the allocated space is sufficient, the data is transferred within the current allocated resources as shown at block 515. If, however, the space is not sufficient, a next determination is made at block 508 whether there are unallocated resources available without causing an overlap with the voice protection window. If there are not sufficient unallocated RF resources available, a cost factor is automatically calculated for assigning additional bandwidth/resources to data as shown at block 509. Then, a next determination is made at block 511 whether the cost factor is in favor of additional data bandwidth being allocated. When the cost factor is in favor of the additional bandwidth or there were sufficient unallocated resources available, the data protection window is adjusted (i.e., slided down) to provide more data bandwidth as shown at block 513. Then, data is transferred within the allocated bandwidth as shown at block 515. The process of adjusting the window returns to block 503 and continues as more voice and data is transmitted.

Key features and benefits of the invention includes:

(1) There is dynamic allocation of radio resources for voice and data services. The radio resources are allocated based on a cost function. The cost function can be based on revenue and business model of an operator. This enables the network provider to allocate resources in a manner that maximizes revenue;

(2) The traffic overflow from one service to other service is allowed. There is no need to determine a hard limit for allocation of radio resources for either service; and (3) The prioritization of a service is allowed if required. There can be a reservation of resources if required for prioritization based on the business requirements.

The invention may be implemented within a CDMA product line. Additionally, the functional features are also applicable to Universal Mobile Telecommunication Service (UMTS) deployment as well. The invention may be utilized for allocation of voice and data resources in both BTS and BSC and improves Grade of Service for voice networks and Quality of Service for data networks.

Since data traffic is bursty in nature, the algorithm implemented by the invention improves QoS for the data traffic. The data traffic is allowed to overflow (i.e., utilize resources) in areas that were traditionally limited to voice traffic. The invention thus eliminates the occurrence of idle voice resources when there is excessive data traffic with limited resources. These additional resources will increase data throughout for the network, thereby improving QoS of the network. Further the invention makes optimization easier and expedites data network rollout and enables product differentiating for the manufacturer's product line and service differentiating for their customers. The invention may also be directly implemented on mobile communication devices.

The invention improves spectral efficiency through utilization of scarce radio resources. These allocations are done dynamically in real time based on the cost function predefined by the operator. The radio resource usage is optimized based on cost function and network conditions in real time. The GoS for voice network and QoS for data network are improved. This makes the RF planning for combined voice and data networks easy as the network planner does not have to define fixed limits for voice and data resource allocations. The network itself determines spectral resource allocation dynamically in a manner that maximizes spectral resource allocation with optimum cost factors.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A system for allocating radio spectral resources to data and voice traffic in a communication network that supports shared frequency transmissions, said system comprising:

means for receiving data traffic and voice traffic;

processing means for dynamically assigning a first percentage of said spectral resources to said data traffic and a second percentage of said spectral resources to said voice traffic, wherein said first percentage and said second percentage add up to at least 100 percent of the available spectral resources and each percentage is dynamically adjustable depending on a presently determined need for data traffic and voice traffic and wherein further when the first and second percentages add up to more than 100 percent, an overlapping percentage of said spectral resources is dynamically allocated to a particular one of said voice traffic and said data traffic based on a cost factor analysis for voice and data traffic; and means, responsive to said dynamically allocating, for transmitting both said data traffic and said voice traffic as radio frequency (RF) transmissions out to said communication network, wherein said data traffic and said voice traffic are transmitted in their respective allocated percentage of said spectral resources.

2. The system of claim 1, wherein said dynamically allocating means further comprises means for determining a current allocated percentage for said voice and data traffic utilizing a cost factor analysis which maximizes revenue.

3. The system of claim 1, wherein said processing means includes:
means for monitoring current spectral resources allocated to both said data traffic and said voice traffic;
means for providing a data window and a voice window bordering an actual percentage utilization of said data traffic and said voice traffic, respectively, wherein a size of each of said windows is adjustable;
means for sliding said data window and said voice window to accommodate a request for additional percentage allocation of said radio frequency to said data traffic and said voice traffic, respectively, wherein said means for sliding expands each percentage of spectral resources allocated to said data traffic and said voice traffic up to a dynamic threshold value, which overlaps into the window of the other type of traffic.

4. The system of claim 3, further comprising:
means for calculating said dynamic threshold value as a function of current percentage allocation, desired need for both data and voice traffic, and cost, wherein said dynamic threshold value represents a point of overlap of said data window and said voice window.

5. The system of claim 3, further comprising means, responsive to a total need of said data traffic and said voice traffic surpassing 100 percent of available spectral resources, for:
overlapping said windows up to said dynamic threshold value; and
allocating a percentage of spectral resources within said overlapping windows to either voice or data depending on a predetermined priority for assigning the overlapped percentage, wherein when priority is assigned to data, the overlapped percentage is allocated to data and when priority is assigned to voice, the overlapped percentage is allocated to voice.

6. The system of claim 5, further comprising:
means for receiving an input of said size of each window; and
means for receiving cost factors associated with said data traffic and said voice traffic as an input to said processing means.

7. The system of claim 1, wherein a sum of said first percentage and said second percentage equals a minimum of actual percentage required and 100 percent.

8. The system of claim 1, wherein said network is a code division multiple access (CDMA) network.

9. The system of claim 1, wherein further said processing means includes:
a processor; and
a program code executed on said processor for completing said dynamically allocating of said percentages of spectral resources.

10. The system of claim 1, wherein said receiving means includes means for generating said data and voice traffic.

11. A method for allocating spectral resources to data and voice traffic in a communication network that supports shared frequency transmissions, said method comprising:
receiving data traffic and voice traffic;
dynamically allocating a first percentage of said spectral resources to said data traffic and a second percentage of said spectral resources to said voice traffic, wherein said first percentage and said second percentage add up to at least 100 percent of the avaliable spectral resources and each percentage is dynamically adjustable depending on a presently determined need for data traffic and voice traffic and wherein further when the first and second percentages add up to more than 100 percent, an overlapping percentage of said spectral resources is dynamically allocated to a particular one of said voice traffic and said data traffic based on a cost factor analysis for data and voice traffic; and
responsive to said dynamically allocating, transmitting both said data traffic and said voice traffic as radio frequency (RF) transmissions out to said communication network, wherein said data traffic and said voice traffic are transmitted in their respective allocated percentage of said spectral resources.

12. The method of claim 11, wherein said dynamically allocating step further comprises determining a current allocated percentage for said voice and data traffic utilizing a cost factor analysis which maximizes revenue.

13. The method of claim 11, wherein said processing step includes:
monitoring current spectral resources allocated to both said data traffic and said voice traffic;
providing a data window and a voice window bordering an actual percentage utilization of said data traffic and said voice traffic, respectively, wherein a size of each of said windows is adjustable; and
sliding said data window and said voice window to accommodate a request for additional percentage allocation of said radio frequency to said data traffic and said voice traffic, respectively, wherein said means for sliding expands each percentage of spectral resources allocated to said data traffic and said voice traffic up to a dynamic threshold value.

14. The method of claim 13, further comprising:
calculating said dynamic threshold value as a function of current percent allocation, desired need for both data and voice traffic, and cost, wherein said dynamic threshold value represents a point of overlap of said data window and said voice window.

15. The method of claim 13, further comprising:
responsive to a total need of said data traffic and said voice traffic surpassing 100 percent of available spectral resources:
overlapping said windows at said dynamic threshold value; and
allocating a percentage of spectral resources within said overlapping windows to either voice or data depending on a predetermined priority assignment of the overlapped percentage, wherein when priority is assigned to data, the overlapped percentage is allocated to data and when priority is assigned to voice, the overlapped percentage is allocated to voice.

16. The method of claim 15, further comprising:
receiving an input of said size of each window; and
receiving cost factors associated with said data traffic and said voice traffic as input.

17. The method of claim 11, wherein a sum of said first percentage and said second percentage equals a minimum of actual percentage required and 100 percentage.

18. The method of claim 11, wherein said network is a code division multiple access (CDMA) network and said transmitting step transmits said data and voice traffic via said CDMA network.

19. The method of claim 11, wherein said receiving step includes generating said data and voice traffic.

20. A computer program product comprising:

a computer readable medium; and program code on said computer readable medium for allocating spectral resources to data and voice traffic in a communication network that supports shared frequency transmissions, said program code comprising code for:

receiving data traffic and voice traffic;

dynamically allocating a first percentage of said spectral resources to said data traffic and a second percentage of said spectral resources to said voice traffic, wherein said first percentage and said second percentage add up to at least 100 percent of the available spectral resources and each percentage is dynamically adjustable depending on a presently determined need for data traffic and voice traffic and wherein further when the first and second percentages add up to more than 100 percent, an overlapping percentage of said spectral resources is dynamically allocated to a particular one of said voice traffic and said data traffic based on a cost factor analysis for data and voice traffic; and responsive to said dynamically allocating, transmitting both said data traffic and said voice traffic as radio frequency (RF) transmissions out to said communication network, wherein said data traffic and said voice traffic are transmitted in their respective allocated percentage of said spectral resources.

21. The computer program product of claim 20, wherein said program code further or dynamically allocating further comprises code for determining a current allocation percentage for said voice and data traffic utilizing a cost factor analysis which maximizes revenue.

22. The computer program product of claim 20, wherein said program code further includes code for:

monitoring current spectral resources allocated to both said data traffic and said voice traffic;

providing a data window and a voice window bordering an actual percentage utilization of said data traffic and said voice traffic, respectively, wherein a size of each of said windows is dynamically adjustable by an administrator of said processing means; and sliding said data window and said voice window to accommodate a request for additional percentage of radio frequency allocation to said data traffic and said voice traffic, respectively, wherein said means for sliding expands a percentage of spectral resources allocated to said data traffic and said voice traffic up to a dynamic threshold value.

23. The computer program product of claim 22, further comprising program code for:

calculating said dynamic threshold value as a function of current percentage allocation, desired need for both data and voice traffic, and cost, wherein said dynamic threshold value represents a point of overlap of said data window and said voice window.

24. The computer program product of claim 22, further comprising program code for:

responsive to a total need of said data traffic and said voice traffic surpassing 100 percent of available spectral resources;

overlapping said windows at said dynamic threshold value; and allocating a percentage of spectral resources within said overlapping windows to either voice or data depending on a predetermined priority of said overlapped state, wherein when priority is assigned to data, the overlapped percentage is allocated to data and when priority is assigned to voice, the overlapped percentage is allocated to voice.

25. The computer program product of claim 24, further comprising program code for:

receiving said size of each window; and receiving cost factors associated with said data traffic and said voice traffic.

26. The computer program product of claim 20, wherein a sum of said first percentage and said second percentage equals a minimum of actual percentage required and 100 percentage.

27. The computer program product of claim 20, wherein said network is a code division multiple access (CDMA) network and said transmitting step transmits said data and voice traffic via said CDMA network.

* * * * *